United States Patent
McNulty et al.

(10) Patent No.: US 11,345,483 B2
(45) Date of Patent: May 31, 2022

(54) ROTORCRAFT-MOUNTED ROTOR BLADE COLLISION WARNING SYSTEM AND METHOD FOR ALERTING A ROTORCRAFT CREW MEMBER OF A POTENTIAL COLLISION OF A ROTOR BLADE

(71) Applicant: The Boeing Company, Chicago, IL (US)

(72) Inventors: Michael J. McNulty, Scottsdale, AZ (US); Donald J. Hunter, Scottsdale, AZ (US)

(73) Assignee: The Boeing Company, Chicago, IL (US)

( * ) Notice: Subject to any disclaimer, the term of this patent is extended or adjusted under 35 U.S.C. 154(b) by 170 days.

(21) Appl. No.: 16/661,035

(22) Filed: Oct. 23, 2019

(65) Prior Publication Data
US 2021/0122491 A1   Apr. 29, 2021

(51) Int. Cl.
*B64D 45/00* (2006.01)
*B64F 5/60* (2017.01)
(Continued)

(52) U.S. Cl.
CPC ........ *B64D 45/0005* (2013.01); *B64C 27/006* (2013.01); *B64C 27/06* (2013.01); *B64F 5/60* (2017.01); *B64D 2203/00* (2013.01)

(58) Field of Classification Search
CPC ............ B64D 45/0005; B64D 2203/00; B64D 2045/001; B64D 2045/0085; B64D 43/00; B64C 27/06; B64C 27/006; B64C 27/39; B64C 27/41; B64C 27/615; B64C 2027/7261; B64C 13/10; B64C 25/28; B64C 27/467; B64C 27/52; B64C 27/57; B64C 27/56; B64C 2027/7266; B64C 27/37; B64C 27/43; B64F 5/60
See application file for complete search history.

(56) References Cited

U.S. PATENT DOCUMENTS 5,855,108 A * 1/1999 Salz ............ A01D 75/182
 56/10.2 G
7,448,855 B2 11/2008 Carbaugh et al.
(Continued)

OTHER PUBLICATIONS

Jayant Sirohi Michael S. Lawson "Measurement of helicopter rotor blade deformation using digital image correlation" Optical Engineering (Year: 2012).*

*Primary Examiner* — Abby Y Lin
*Assistant Examiner* — Esvinder Singh
(74) *Attorney, Agent, or Firm* — Walters & Wasylyna LLC

(57) ABSTRACT

A method is provided for alerting a rotorcraft crew member of a potential collision of a rotor blade of the rotorcraft having a rotor shaft and a rotor azimuth. The method comprises estimating a total rotor flapping value associated with the rotor blade during an operating condition of the rotorcraft. The estimated total rotor flapping value is relative to the rotor shaft as a function of the rotor azimuth. The method also comprises comparing the estimated total rotor flapping value to a rotor flapping limit value during the operating condition of the rotorcraft. The method further comprises sending a warning signal to a warning device when the estimated total rotor flapping value lies outside of the rotor flapping limit value to alert the rotorcraft crew member of a potential collision of the rotor blade of the rotorcraft.

20 Claims, 8 Drawing Sheets

(51) Int. Cl.
  *B64C 27/00* (2006.01)
  *B64C 27/06* (2006.01)

(56) References Cited

U.S. PATENT DOCUMENTS

| | | | |
|---|---|---|---|
| 7,674,091 B2 | 3/2010 | Zierten | |
| 9,008,872 B2 | 4/2015 | Pflug et al. | |
| 9,533,768 B2 | 1/2017 | Barmichev et al. | |
| 9,567,102 B1 * | 2/2017 | Ross | B64F 1/20 |
| 9,708,030 B1 | 7/2017 | Gabrys et al. | |
| 2013/0268154 A1 * | 10/2013 | Kreitmair-Steck | B64F 5/60 |
| | | | 701/29.1 |
| 2014/0271188 A1 * | 9/2014 | Dillon | B64F 5/60 |
| | | | 416/1 |
| 2014/0374534 A1 * | 12/2014 | McCollough | B64C 27/82 |
| | | | 244/17.21 |
| 2016/0153775 A1 * | 6/2016 | Hocquette | B64C 27/008 |
| | | | 356/139.03 |
| 2016/0304190 A1 * | 10/2016 | Groh | B64C 27/605 |
| 2017/0213468 A1 * | 7/2017 | Duerksen | G08G 5/065 |
| 2018/0222597 A1 * | 8/2018 | Covington | G05B 13/00 |
| 2019/0248506 A1 * | 8/2019 | Scott | B64D 45/0005 |

* cited by examiner

ROTORCRAFT-MOUNTED ROTOR BLADE COLLISION WARNING SYSTEM AND METHOD FOR ALERTING A ROTORCRAFT CREW MEMBER OF A POTENTIAL COLLISION OF A ROTOR BLADE

FIELD

The present application relates to rotorcraft rotor blades, and is particularly directed to a rotorcraft-mounted rotor blade collision warning system and method of alerting a rotorcraft crew member of a potential collision of a rotor blade with another component of the rotorcraft.

BACKGROUND

A typical rotorcraft includes two or more rotor blades operatively mounted on top of the rotorcraft. Each rotor blade may have the potential to strike an airframe part of the rotorcraft. The potential of the rotor blade to strike the airframe part is problematic, especially during ground operations of the rotorcraft such as during taxiing and takeoffs. Accordingly, those skilled in the art continue with research and development efforts in the field of rotorcraft including rotor blades and their potential to collide with the airframe part of the rotorcraft.

SUMMARY

In one aspect, a method is provided for alerting a rotorcraft crew member of a potential collision of a rotor blade of the rotorcraft having a rotor shaft and a rotor azimuth. The method comprises estimating a total rotor flapping value associated with the rotor blade during an operating condition of the rotorcraft. The estimated total rotor flapping value is relative to the rotor shaft as a function of the rotor azimuth. The method also comprises comparing the estimated total rotor flapping value to a rotor flapping limit value during the operating condition of the rotorcraft. The method further comprises sending a warning signal to a warning device when the estimated total rotor flapping value lies outside of the rotor flapping limit value to alert the rotorcraft crew member of a potential collision of the rotor blade of the rotorcraft.

In another aspect, a rotorcraft-mounted rotor blade collision warning system comprises a plurality of sensors associated with the rotorcraft and for providing a plurality of signals indicative of operating parameters of the rotorcraft. The warning system also comprises a warning device for alerting a rotorcraft crew member of a potential collision of a rotorcraft rotor blade. The warning system further comprises a controller module configured to (i) calculate an estimated total rotor flapping state associated with the rotorcraft rotor blade, (ii) compare the estimated total rotor flapping state with a rotor flapping limit, and (iii) send a signal to the warning device to alert a rotorcraft crew member of a potential collision of a rotorcraft rotor blade when the estimated total rotor flapping state is outside of the rotor flapping limit to alert the rotorcraft crew member of a potential collision of the rotorcraft rotor blade.

Other aspects will become apparent from the following detailed description, the accompanying drawings and the appended claims.

DETAILED DESCRIPTION

The present application is directed to a rotor blade collision warning system and method of alerting a rotorcraft crew member of a potential collision of a rotor blade. The specific warning system and method, and the industry in which the system and method are implemented may vary. It is to be understood that the disclosure below provides a number of embodiments or examples for implementing different features of various examples. Specific examples of components and arrangements are described to simplify the present disclosure. These are merely examples and are not intended to be limiting.

The disclosure below describes a rotor blade collision warning system and method for rotorcraft. The rotor blade collision warning system and method may be implemented in compliance with Federal Aviation Administration (FAA) regulations and/or Military Specifications. Such regulations and specifications are known and, therefore, will not be described.

Figure 1:
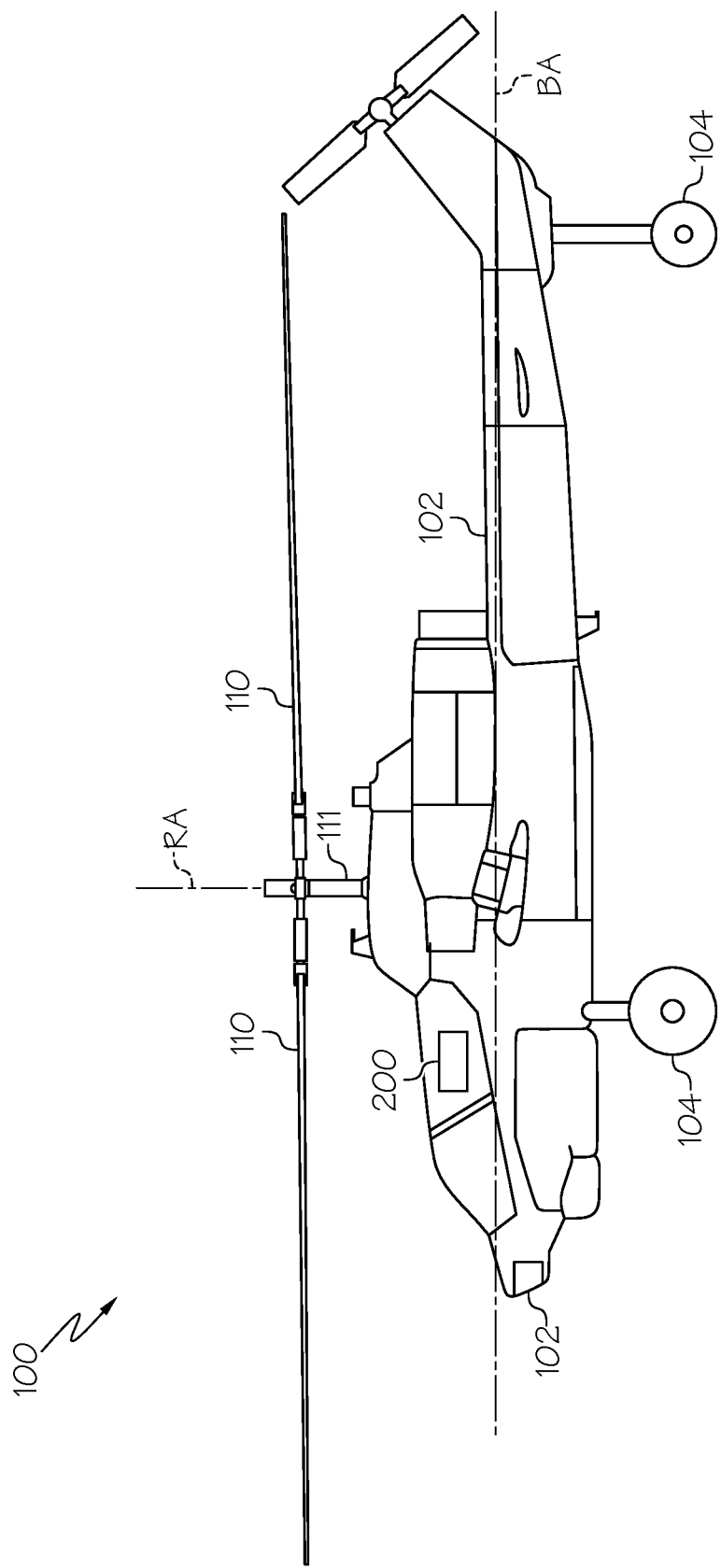
FIG. 1 is a schematic diagram of an example rotorcraft embodying a rotor blade collision warning system in accordance with an example implementation.

Referring to FIG. 1, a rotorcraft generally designated 100, embodying a rotor blade collision warning system in accordance with an example implementation, is illustrated. The rotorcraft 100 is in the form of a helicopter that includes a fuselage 102 and wheels 104 coupled to bottom of the fuselage 102 in known manner. Alternatively (or additionally), landing skids may be coupled to the bottom of the fuselage 102 in known manner. The rotorcraft 100 also includes two or more rotor blades 110 coupled to top of the fuselage 102 in known manner. The rotorcraft 100 has a longitudinal body axis BA.

The rotorcraft 100 further includes an onboard-mounted rotor blade collision warning system 200. The rotor blade collision warning system 200 may be mounted to the rotorcraft 100 at any suitable or appropriate location. For simplicity and purposes of description herein, the rotor blade collision warning system 200 is mounted to fuselage 102, as only schematically shown in FIG. 1. Those skilled in the art will appreciate that the rotor blade collision warning system 200 may be mounted to the rotorcraft 100 at any other suitable or appropriate location.

Figure 2:
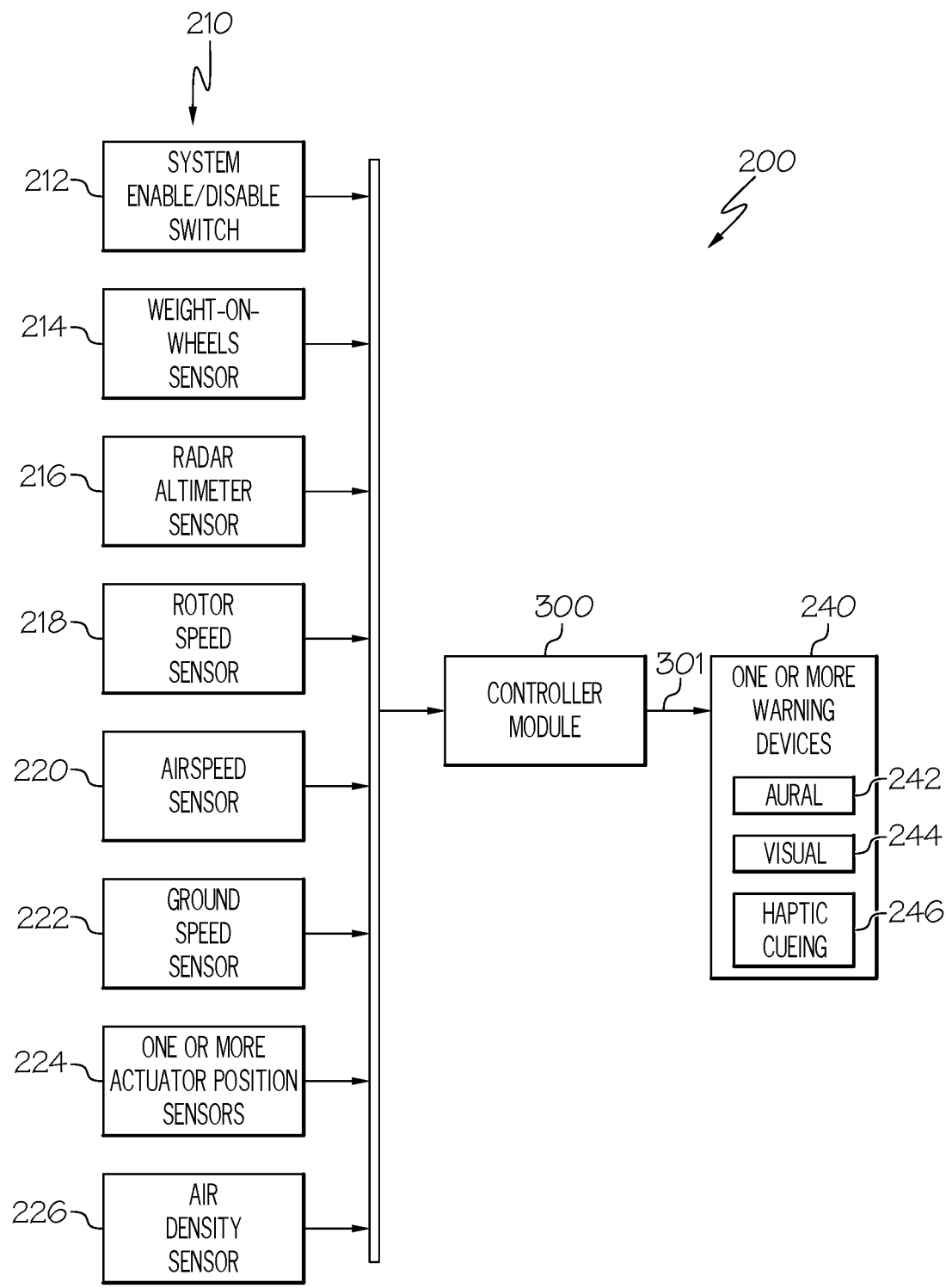
FIG. 2 is a block diagram of the rotor blade collision warning system of FIG. 1 constructed in accordance with an example implementation.

Referring to FIG. 2, a block diagram of the rotor blade collision warning system 200 of FIG. 1 is illustrated. The rotor blade collision warning system 200 includes a plurality of sensors 210 associated with the rotorcraft 100. The plurality of sensors 210 comprise, but are not limited to, a system enable/disable switch 212, a weight-on-wheels sensor 214, a radar altimeter sensor 216, a rotor speed sensor 218, an airspeed sensor 220, a ground speed sensor 222, one or more actuator position sensors 224, and an air density sensor 226. The plurality of sensors 210 provide a plurality of signals indicative of operating parameters of the rotorcraft 100.

The output signal from the system enable/disable switch 212 is indicative of whether the rotor blade collision warning system 200 is enabled or disabled. The output signal from the weight-on-wheels sensor 214 indicative of whether the weight of the fuselage 102 is on the wheels 104. The output signal from the radar altimeter sensor 216 is indicative of the altitude of the rotorcraft 100. The output signal from the rotor speed sensor 218 is indicative of the rotational speed of the rotor blades 110 about its rotor shaft 111 (FIG. 1) which extends along rotor axis RA.

The output signal from the airspeed sensor 220 is indicative of the velocity of the rotorcraft 100 in the air. In a particular implementation, airspeed sensor 220 measures both the wind speed and direction, as the wind can either relieve or increase the flapping imposed by the controls depending on its direction relative to the rotorcraft 100. The output signal from the ground speed sensor 222 is indicative of speed of the rotorcraft 100 relative to the ground. The output signal from the one or more actuator position sensors 224 is indicative of positions of cyclic actuators and collective actuators used in rotorcraft as is known. The output signal from the air density sensor 226 is indicative of the density of the air surrounding the fuselage 102 of the rotorcraft 100.

The rotor blade collision warning system 200 also includes a warning device 240 for alerting a crew member of a potential collision of any one of the rotor blades 110. The warning device 240 may comprise an aural warning device 242, a visual warning device 244, a haptic cueing warning device 246, or a combination of these. As an example, the warning device 240 may include an audio device to audibly alert a crew member of a potential collision of a rotor blade. As another example, the warning device 240 may include a light emitting diode (LED) to visually alert a crew member of a potential collision of a rotor blade. As yet another example, the warning device 240 may include a haptic cueing system to alert the crew of the potential of a rotor blade collision.

The rotor blade collision warning system 200 further includes a controller module 300 configured to provide one or more output signals 301 to the warning device 240 to alert a crew member of a potential collision of a rotor blade. The controller module 300 may comprise a portion of a computer which can be used in a rotorcraft without a rotor blade collision warning system. As one example, the controller module 300 may comprise a portion of a portable electronic device, such as a laptop computer or tablet. As another example, the controller module 300 may comprise a portion of a Class 1 Electronic Flight Bag. As yet another example, the controller module 300 may comprise a portion of a Class 2 Electronic Flight Bag. Alternatively, the controller module 300 may comprise a dedicated computer for providing the one or more output signals 301 to the warning device 240 to alert the crew member of a potential collision of a rotor blade.

Figure 3:
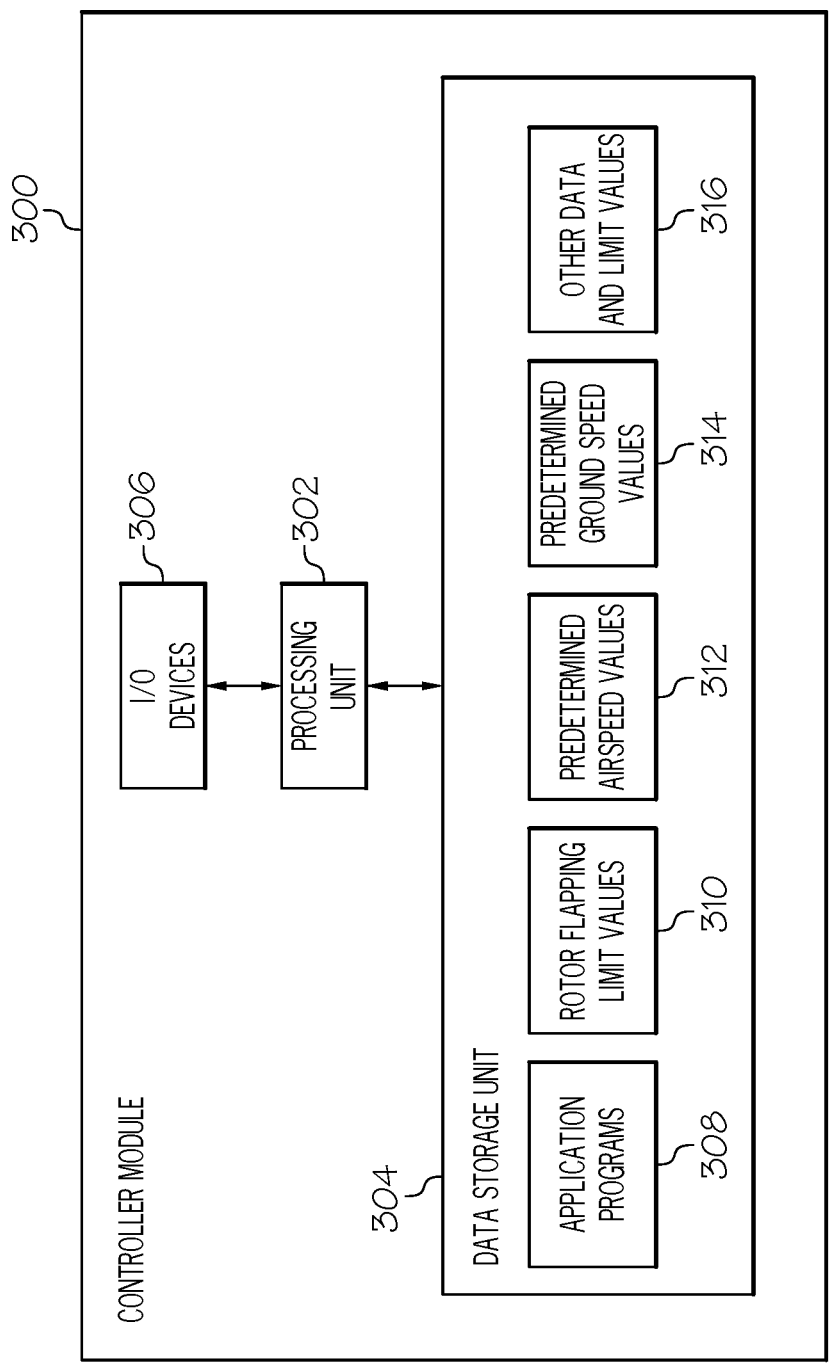
FIG. 3 shows an example controller module which can be used in the rotor blade collision warning system of FIG. 2.

Referring to FIG. 3, the controller module 300 includes a processing unit 302 that communicates with a data storage unit 304 and a number of input/output (I/O) devices 306. The processing unit 302 executes program instructions stored in the data storage unit 304, external data storage unit (not shown), or a combination thereof. The data storage unit 304 is configured to store one or more warning-signal generating application programs 308, one or more rotor flapping limit values 310, one or more predetermined airspeed values 312, one or more predetermined ground speed values 314, and other data and limit values 316 (e.g., rotor speed values).

The processing unit 302 may comprise any type of technology. For example, the processing unit 302 may comprise a dedicated-purpose electronic processor. Other types of processors and processing unit technologies are possible. The data storage unit 304 may comprise any type of technology. For example, data storage unit 304 may comprise random access memory (RAM), read only memory (ROM), solid state memory, or any combination thereof. Other types of memories and data storage unit technologies are possible.

The number of I/O devices 306 may comprise any type of technology. For example, I/O devices 306 may comprise a keypad, a keyboard, a touch-sensitive display screen, a liquid crystal display (LCD) screen, a microphone, a speaker, or any combination thereof, as well as the switches 212 and sensors 214, 216, 218, 220, 222, 224, 226 shown in FIG. 2. Other types of I/O devices and technologies are possible.

In accordance with an aspect of the present disclosure, the controller module 300 is responsive to a combination of sensor data associated with the operating condition of the rotorcraft 100. The sensor data is provided by the plurality of sensors 210 including the system enable/disable switch 212, the weight-on-wheels sensor 214, the radar altimeter sensor 216, the rotor speed sensor 218, the airspeed sensor 220, the ground speed sensor 222, the one or more actuator position sensors 224, and the air density sensor 226.

More specifically, the processing unit 302 executes instructions of one of the warning-signal generating application programs 308 stored in the data storage unit 304 to calculate an estimated total rotor flapping value associated with the rotor blades 110. Operation of the controller module 300 is described hereinbelow.

The rotor blade collision warning system 200 is disabled when the rotor speed sensor 218 provides a signal indicative of the rotor speed not exceeding a predetermined rotor speed value that is stored in the data storage unit 304 as one of the other data and limit values 316. The rotor blade collision warning system 200 is also disabled when the airspeed sensor 220 provides a signal indicative of the airspeed exceeding a predetermined airspeed value that is stored in the data storage unit 304 as one of the one or more predetermined airspeed values 312. Also, the rotor blade collision warning system 200 is disabled when the ground speed sensor 222 provides a signal indicative of the ground speed exceeding a predetermined ground speed value that is stored in the data storage unit 304 as one of the one or more predetermined ground speed values 314. The rotor blade collision warning system 200 could also be disabled when the weight-on-wheels sensor 214 is off and when the radar altimeter sensor 216 exceeds a predetermined value. At this point, those skilled in the art will appreciate that the rotor blade collision warning system 200 can be disabled when data indicates the rotorcraft 100 is clearly flying, as the rotor blade collision warning system 200 is not intended to be active in when the rotorcraft 100 is in flight.

Figure 4A:
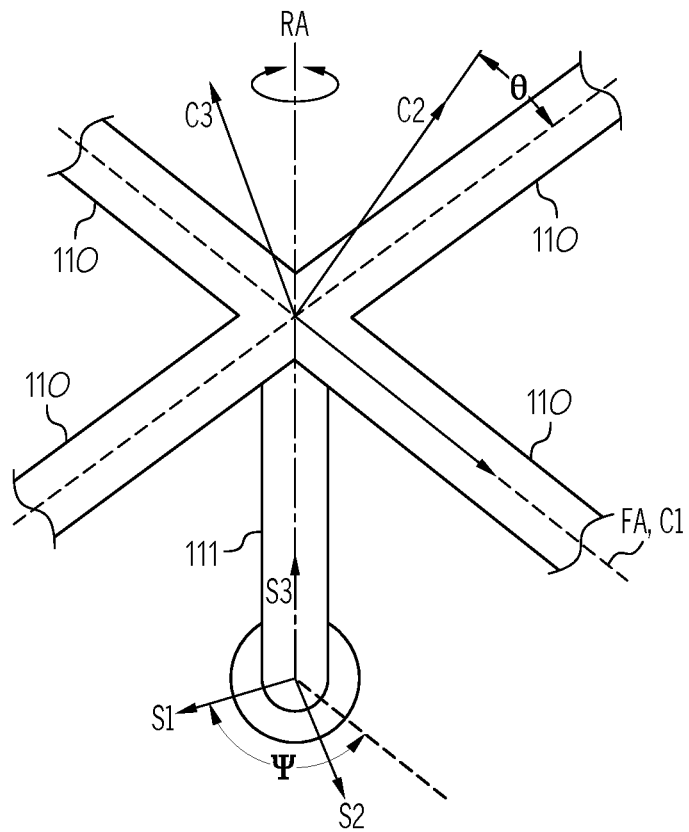
FIG. 4A is a coordinates diagram of parts of the rotorcraft of FIG. 1, and showing different parameters including axes and angles taken into account by the controller module of FIG. 3.

The processing unit 302 of the controller module 300 calculates an estimated total rotor flapping value (i.e., flapping state) associated with the rotor blades 110. In some examples, the rotor flapping value is relative to the rotor shaft 111 as a function of a rotor azimuth p (FIG. 4A). The processing unit 302 compares the estimated total rotor flapping value with a rotor flapping limit value that is stored in the data storage unit 304 as one of the one or more rotor flapping limit values 310. The processing unit 302 then sends one or more output signals 301 to the warning device 240 to alert a rotorcraft crew member of a potential collision of one of the rotor blades 110 when the estimated total rotor flapping value is outside of the rotor flapping limit value 310 to alert the rotorcraft crew member of a potential collision of the one of the rotor blades 110.

Figure 4B:
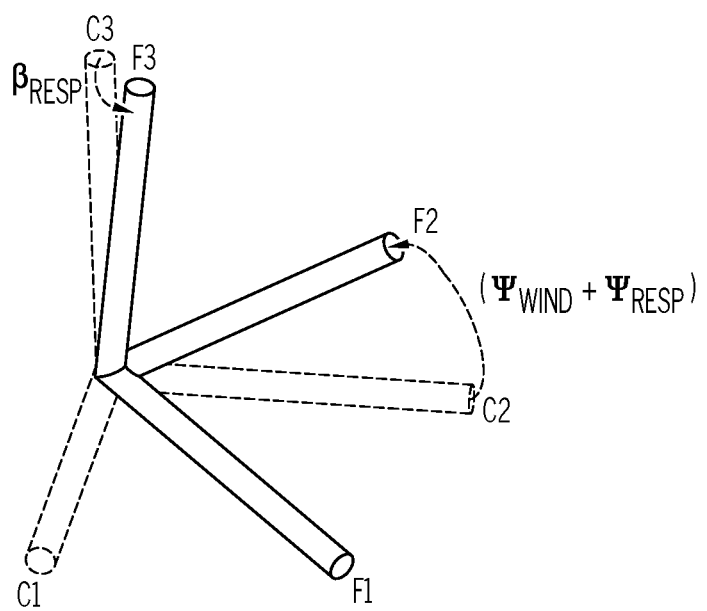
FIG. 4B is a coordinates diagram showing certain axes and angles associated with the rotorcraft of FIG. 1.
Figure 4C:
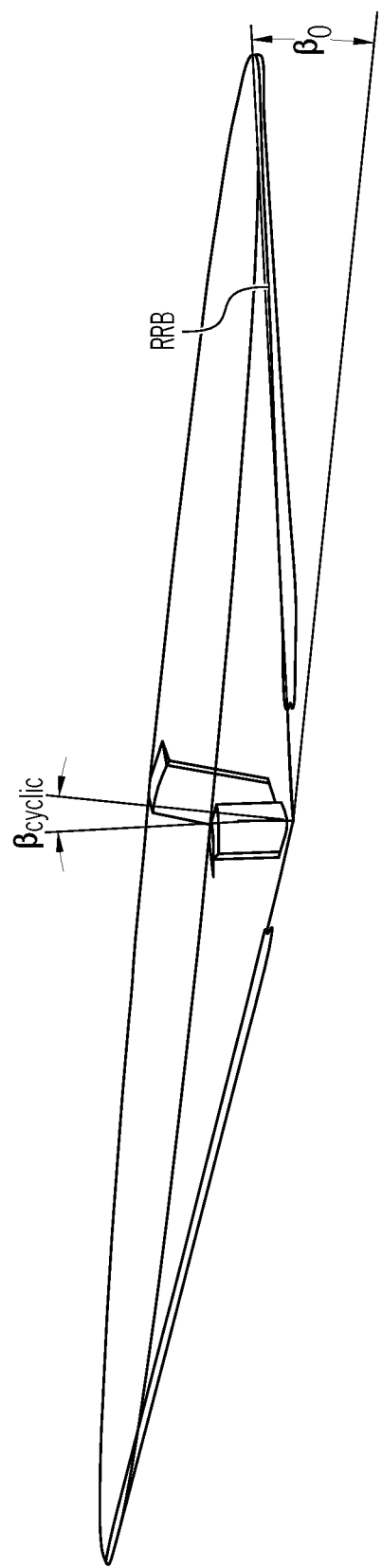
FIG. 4C is a coordinates diagram showing certain rotor blade angles associated with the rotorcraft of FIG. 1.

Referring to FIGS. 4A, 4B, and 4C, coordinates diagrams show different parameters including axes and angles taken into account by the controller module 300 of FIG. 3 to provide an estimated total rotor flapping value. More specifically, FIGS. 4A, 4B, and 4C show the locations of different axes and angles used in the algorithm below to calculate the estimated total rotor flapping value.

The following example may be applied to provide an estimated total rotor flapping value with reference to the axes and angles shown in FIGS. 4A, 4B and 4C, where:

S (i.e., S1, S2, and S3) is the orthogonal axis system of the rotorcraft airframe;

S1 axis points aft towards the tail of the rotorcraft;

S2 axis points to the starboard (i.e., right side) of the rotorcraft;

S3 axis points upwards and is aligned with the rotor shaft 111 of the rotorcraft;

$\psi$ (rotor azimuth) is the angle through which the reference rotor blade RRB advances in rotation about the S3 axis, starting from S1;

$\psi_{cyclic}$ is the rotation of the reference rotor blade RRB about the S3 axis from the S1 axis to the rotor azimuth at which the RRB reaches its most nose-up pitch angle;

$\theta_{cyclic}$ is the amplitude of the cyclic variation of the pitch of the RRB;

$\theta_{collective}$ is the mean value of the pitch of the RRB;

$\theta$ is the pitch angle of the reference rotor blade, which is equal to:

$\theta_{collective} + \theta_{cyclic}[\cos(\psi - \psi_{cyclic})]$;

C (i.e., C1, C2, and C3) is a control axis system, which is defined as follows:

$C1 = S1[\cos(\psi_{cyclic})] + S2[\sin(\psi_{cyclic})]$ $C2 = -S1[\sin(\psi_{cyclic})][\cos(\theta_{cyclic})] + S2[\cos(\psi_{cyclic})][\cos(\theta_{cyclic})] + S3[\sin(\theta_{cyclic})]$ $C3 = S1[\sin(\psi_{cyclic})][\sin(\theta_{cyclic})] - S2[\cos(\psi_{cyclic})][\sin(\theta_{cyclic})] + S3[\cos(\theta_{cyclic})]$.

Referring to FIG. 4B and starting with the control axis system C from above, the component of the relative wind in the C1 direction is called the longitudinal airspeed, the component in the C2 direction is called the lateral airspeed, and the component in the C3 direction is called the inflow. The angle of the relative wind in the C1-C2 plane from C1 is $\psi_{wind}$. An angle $\psi_{response}$ defines the azimuth of maximum cyclic flapping response relative to the relative wind. A representative calculation $\psi_{response}$ is included below. The transformation from the control axis system, C, to the flap axis system, F, is found by a rotation of $(\psi_{wind} + \psi_{response})$ about C3 followed by a rotation of $\beta_{response}$ about the new C2, which equals F2, axis. A representative calculation of $\beta_{response}$ is included below. Then the plane perpendicular to F3 is the plane in which the rotors cyclic flapping is zero. The orientation of this plane in the S axis system defines the cyclic flapping of the rotor relative to the rotor shaft.

Referring to FIG. 4C, a cyclic flap angle $\beta_{cyclic}$ and a rotor cone angle $\beta_0$ associated with the reference rotor blade RRB are illustrated. In terms of the rotorcraft parameters already described above, the cyclic flap angle $\beta_{cyclic}$ is defined as the periodically varying part of the blade flapping angle relative to a plane perpendicular to the shaft axis, S3. In terms of the rotorcraft parameters already described above, the rotor cone angle $\beta_0$ is defined as the mean blade flapping angle relative to a plane perpendicular the shaft axis, S3.

It should be apparent from the above description that the pitch angle $\theta$ is sinusoidal with the maximum angle occurring when the reference rotor blade RRB has rotated through an angle $\psi_{cyclic}$ (i.e., a rotation about S3 of a feathering axis FA of the reference rotor blade RRB of $\psi_{cyclic}$ from S1). It should also be apparent that the control axis C is defined by a second rotation of $\theta_{cyclic}$ about the feathering axis FA.

Figure 5:
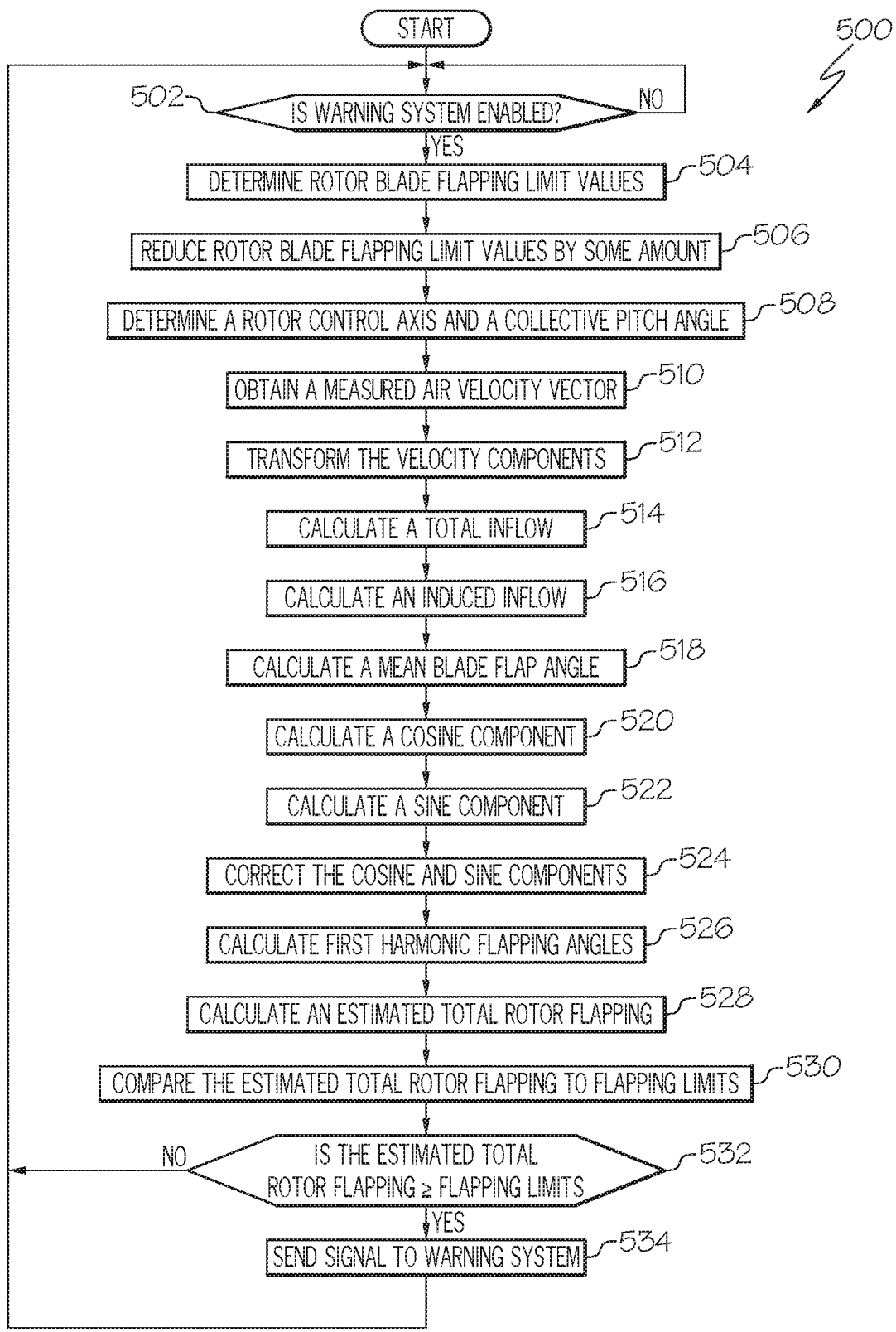
FIG. 5 is a flow diagram depicting a rotor blade collision warning method in accordance with an example implementation.

Referring to FIG. 5, a flow diagram 500 depicts a rotor blade collision warning method in accordance with an example implementation. The flow diagram 500 follows an example scenario showing example calculations of the above-identified algorithm with reference to coordinates shown in FIGS. 4A, 4B, and 4C. In block 502, a determination is made as to whether the rotor blade collision warning system 200 is enabled. In some examples, the rotor blade collision warning system 200 is enabled when the rotor speed is above a threshold value and either the weight-on-wheels sensor 214 indicates TRUE or the altitude signal from the radar altimeter sensor 216 is below a threshold value (e.g., two feet). In some examples, it may be desirable to disable the rotor blade collision warning system 200 if either the airspeed as indicated by the airspeed sensor 220 exceeds a threshold value (e.g., 50 knots) or the ground speed as indicated by the ground speed sensor 222 exceeds a threshold value (e.g., 65 knots). If the determination in block 502 is negative (i.e., the warning device 240 is not enabled), the process continues to monitor for enabling of the warning device 240). However, if the determination in block 502 is affirmative (i.e., the warning device 240 is enabled), the process proceeds to block 504.

In block 504, rotor blade flapping limit values are determined (e.g., calculated). In some examples, a rotor blade flapping limit value may be calculated as a function of rotor speed. In some examples, a rotor blade flapping limit value is calculated based upon a combination of rotor speed, rotor azimuth $\psi$, and rotor elastic deformations. As an example, pitch and roll limit values may differ. The process proceeds to block 506 in which the calculated rotor blade flapping limit values can optionally be reduced by some amount to provide a desired margin of safety. The process then proceeds to block 508.

In block 508, the rotor control axis (i.e., C shown in FIG. 4A) and a rotor blade collective pitch are calculated. The calculations may be based on the cyclic position and collective position of the one or more actuator position sensors 224 shown in FIG. 2. More specifically, the calculated results represent the spatial orientation of the control axis C (FIG. 4A) relative to the rotor shaft axis RA, and the rotor blade collective pitch angle $\theta_{collective}$. The orientation of the rotor control axis C is defined by a finite pitch rotation in the rotor shaft axis RA and a finite roll rotation in the rotor shaft axis RA. The process proceeds to block 510.

In block 510, a measured air velocity vector is obtained. This velocity vector is composed of the rotorcraft's motion in inertial space and the local wind, along the body axis BA (FIG. 1) of the rotorcraft 100. Then in block 512, the velocity components of the velocity vector are transformed into the control axis C using the orientation of the shaft axis RA in the body axis BA, and the orientation of the control axis C in the shaft axis RA. The resulting air velocity components are called the longitudinal air velocity component, the lateral air velocity component, and the inflow air velocity component. The process proceeds to block 514.

In block 514, a non-dimensional total inflow, $\lambda$, is calculated. The total inflow is the sum of the inflow and the induced inflow. In some examples, the total inflow is calculated based upon properties of the rotor blade, the blade collective pitch angle $\theta_{collective}$ calculated in block 508, the air density, the rotor speed, and the longitudinal, lateral, and inflow air velocity components from block 512. A representative calculation for the inflow would be to iteratively solve:

$$4\pi[\lambda^2 + \mu^2]^{1/2}\left(\frac{Vin}{\Omega R} - \lambda\right) = ab\left(\frac{c}{R}\right)\left[\frac{\theta}{3} + \frac{\mu^2\theta}{2} + \frac{\lambda}{2}\right]$$

for $\lambda$, where $\mu$ is square root of the sum of squares of the longitudinal and lateral airspeeds divided by the rotor blade tip speed ($\Omega R$), a is the rotor's lift curve slope, b is number of blades of the rotor, c is the mean blade chord length, R is the rotor radius, $\Omega$ is the rotor's rotational speed, $\theta$ is $\theta_{collective}$, and Vin is the inflow air velocity. Then in block 516, an induced inflow may be calculated by removing the inflow air velocity component from block 512 from the total inflow calculated in block 514. The process proceeds to block 518.

In block 518, a mean blade flap angle (a.k.a., the cone angle $\beta_0$ shown in FIG. 4C) is calculated based upon properties of the rotor blade, the air density, the collective blade pitch angle $\theta_{collective}$, the longitudinal and lateral air velocity components, the calculated total inflow, and the rotor speed. A representative calculation of $\beta_0$ is:

$$\beta_0 = \frac{1}{2}\gamma\left[\frac{\theta}{4}(1+\mu^2) + \frac{\lambda}{3}\right] - \frac{S_1 g}{I_1 \Omega^2}$$

where in addition to the parameters described already, y is the rotor blades Locke number, $S_1$ is the rotor blade's first moment of inertia about the effective flapping hinge, $I_1$ is the rotor blade's second mass moment of inertia about the effective flapping hinge, and g is the acceleration of gravity.

The process then proceeds to block 520 in which the cosine component of the blade flapping relative to the control axis C is calculated based upon the longitudinal and lateral air velocity components, the collective blade pitch angle $\theta_{collective}$, and the calculated total inflow. Also, as shown in block 522, the sine component of the blade flapping relative to the control axis C is calculated based upon the longitudinal and lateral air velocity components and the cone angle $\beta_0$ as calculated in block 518. Representative equations for the cosine and sine flapping components are:

$$\beta_c = \mu\left(\frac{8}{3}\theta + 2\lambda\right) \Big/ \left(1 - \frac{1}{2}\mu^2\right)$$

and $$\beta_s = \frac{4}{3}\frac{\mu\beta_0}{\left(1 + \frac{1}{2}\mu^2\right)}$$

The total flapping response amplitude due the wind, $\beta_{resp}$, and its direction relative to the wind, $\psi_{resp}$ are then calculated as:

$$\beta_{resp} = \sqrt{\beta_c^2 + \beta_s^2}$$

and $$\psi_{resp} = \tan^{-1}(\beta_s/\beta_c)$$

The process proceeds to block 524.

In block 524, the cosine and sine components calculated in blocks 520 and 522 are corrected to be relative to the rotorcraft's longitudinal body axis BA. This correction is performed by using the arctangent of the lateral air velocity component divided by the longitudinal air velocity component. These corrected angles are then added to the orientation angles that located the control axis C, as shown in block 526, to provide the rotor's first harmonic flapping angles relative to the rotor shaft axis RA. The process proceeds to block 528 in which the first harmonic flapping angles are added to the mean blade flap angle $\beta_0$ calculated in block 518 to provide an estimated total rotor flapping angle relative to the rotor shaft axis RA as a function of the rotor azimuth $\psi$. The process then proceeds to block 530.

In block 530, the estimated total rotor flapping angle from block 528 is compared to the flapping limits of blocks 504 and 506. As an example comparison, if the rotorcraft 100 has radially symmetric limits, the comparison of block 530 can be expressed by the following equation:

$$\left[\beta_0 - \sqrt[2]{\text{lateral } flapping^2 + \text{longitudinal } flapping^2}\right] > \text{flapping limit}$$

If at any azimuth $\psi$ the estimated total rotor flapping angle exceeds (or equals) a flapping limit in block 532, the process proceeds to block 534 in which a signal is sent to the rotor blade collision warning system 200 to alert a rotorcraft crew member of a potential collision of a rotor blade. Otherwise, the estimated total rotor flapping angle is less than the flapping limit and the process returns back to block 502 to repeat the process described herein.

Figure 6:
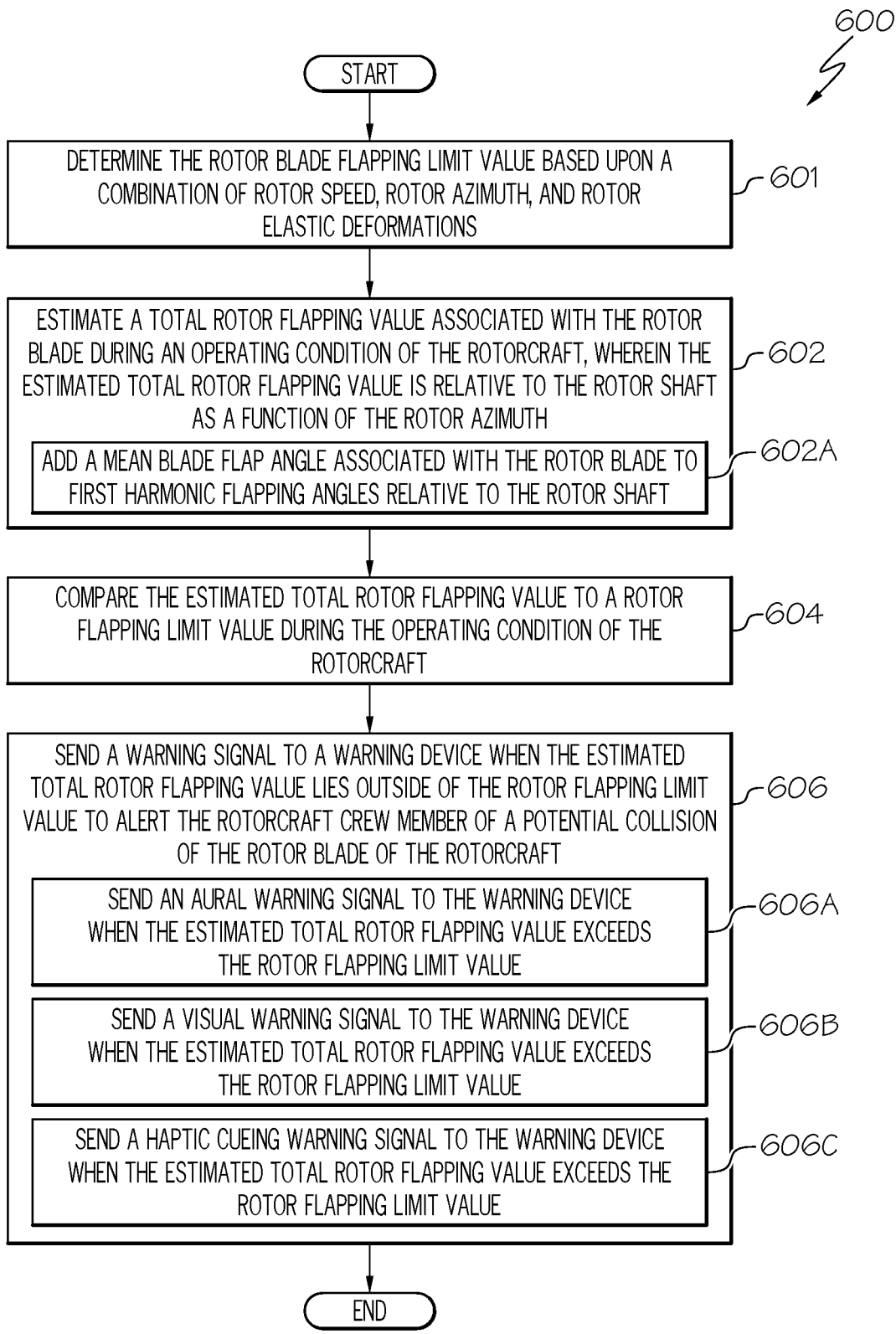
FIG. 6 is a flow diagram depicting a rotor blade collision warning method in accordance with another example implementation.

Referring to FIG. 6, a flow diagram 600 depicts a rotor blade collision warning method in accordance with another example implementation. The warning method provides a signal to alert a rotorcraft crew member of a potential collision of a rotor blade of the rotorcraft.

In block 601, a rotor blade flapping limit value is determined based upon a combination of rotor speed, rotor azimuth $\psi$, and rotor elastic deformations.

In block 602, a total rotor flapping value associated with the rotor blade during an operating condition of the rotorcraft is estimated. The estimated total rotor flapping value is relative to the rotor shaft as a function of the rotor azimuth $\psi$. In this manner, method 600 includes adding a mean blade flap angle associated with the rotor blade to first harmonic flapping angles relative to the rotor shaft in block 602A.

Then in block 604, the estimated total rotor flapping value is compared to a rotor flapping limit value during the operating condition of the rotorcraft. The process proceeds to block 606 in which a warning signal 301 is sent to a warning device when the estimated total rotor flapping value lies outside of the rotor flapping limit value to alert the rotorcraft crew member of a potential collision of the rotor blade of the rotorcraft. In one example, sending a warning signal to a warning device when the estimated total rotor flapping value lies outside of the rotor flapping limit value to alert the rotorcraft crew member of the rotor blade of the rotorcraft comprises sending a warning signal to an aural warning device 242 when the estimated total rotor flapping value exceeds the rotor flapping limit value, in block 606A. In another example, sending a warning signal to a warning device when the estimated total rotor flapping value lies outside of the rotor flapping limit value to alert the rotorcraft crew member of the rotor blade of the rotorcraft comprises sending a warning signal to a visual warning device 244 when the estimated total rotor flapping value exceeds the rotor flapping limit value, in block 606B. In yet another example, wherein sending a warning signal to a warning device when the estimated total rotor flapping value lies outside of the rotor flapping limit value to alert the rotorcraft crew member of the rotor blade of the rotorcraft comprises sending a warning signal to a haptic cueing warning device 246 when the estimated total rotor flapping value exceeds the rotor flapping limit value, in block 606C. The process then ends.

In some examples, the estimating a total rotor flapping value associated with the rotor blade during the operating condition of the rotorcraft comprises adding a mean blade flap angle associated with the rotor blade to first harmonic flapping angles relative to the rotor shaft.

In some examples, the mean blade flap angle associated with the rotor blade is calculated based upon rotor speed, rotor blade properties, rotor hub properties, collective pitch of the rotor blade, air density, total inflow of air, and longitudinal and lateral air velocity components of a measured air velocity vector.

In some examples, the total inflow of air is a sum of an inflow air velocity component of the measured air velocity vector and an induced inflow that is calculated based upon rotor speed, rotor blade properties, rotor hub properties, collective pitch of the rotor blade, air density, and longitudinal and lateral air velocity components of the measured air velocity vector.

In some examples, the longitudinal, lateral, and inflow air velocity components of the measured air velocity vector are transformed into a rotor control axis using (i) an orientation of a rotor shaft axis in a rotorcraft body axis, and (ii) an orientation of the rotor control axis in the rotor shaft axis.

In some examples, the orientation of the rotor control axis is defined by a finite pitch rotation in the rotor shaft axis and a finite roll rotation in the rotor shaft axis.

In some examples, the sending a warning signal 301 to a warning device when the estimated total rotor flapping value lies outside of the rotor flapping limit value to alert the rotorcraft crew member of the rotor blade of the rotorcraft comprises sending an aural warning signal 301 to the warning device when the estimated total rotor flapping value exceeds the rotor flapping limit value.

In some examples, the sending a warning signal 301 to a warning device when the estimated total rotor flapping value lies outside of the rotor flapping limit value to alert the rotorcraft crew member of the rotor blade of the rotorcraft comprises sending a visual warning signal 301 to the warning device when the estimated total rotor flapping value exceeds the rotor flapping limit value.

In some examples, the sending a warning signal 301 to a warning device when the estimated total rotor flapping value lies outside of the rotor flapping limit value to alert the rotorcraft crew member of the rotor blade of the rotorcraft comprises sending a haptic cueing warning signal 301 to the warning device when the estimated total rotor flapping value exceeds the rotor flapping limit value.

In some examples, the method further comprises determining the rotor blade flapping limit value based upon a combination of rotor speed, rotor azimuth $\psi$, and rotor elastic deformations.

In some examples, the method is performed by a computer having a memory executing one or more programs of instructions which are tangibly embodied in a program storage medium readable by the computer.

It should be apparent that the rotor blade collision warning system 200 only uses sensors in a fixed (i.e., non-rotating) configuration. Moreover, the sensors used in the rotor blade collision warning system 200 are already used in most modern-day helicopters. As such, no additional sensors are required during production and even during retrofit applications of a warning system in accordance with the present disclosure. Also, a crew member is alerted through already existing caution/warning devices that the cyclic control input should be reduced to avoid a potential rotor blade collision. Therefore, no additional warning devices are required during production or a retrofit application.

It should also be apparent that application of the rotor blade collision warning system 200 described hereinabove is especially advantageous during ground operations, such as during ground taxiing, slope landings, rolling landings, and rolling takeoffs.

It should further be apparent that application of the disclosed rotor blade collision warning system 200 prevents rotor blade impact with the nose or the tail of the rotorcraft 100. Also, main rotor droop stop pounding is prevented, and main rotor strap stress is reduced. The rotor blade collision warning system 200 is an alert-only type of system, and therefore does not interfere with current flight control modes.

Coded instructions to implement the above methods may be stored in a mass storage device, in a volatile memory, in a non-volatile memory, and/or on a removable tangible computer readable storage medium such as a CD or DVD.

The example methods may be implemented using machine readable instructions that comprise a program for execution by a processor such as the processing unit 302 shown in the example controller module 300 discussed above. The program may be embodied in software stored on a tangible computer readable storage medium such as a CD-ROM, a floppy disk, a hard drive, a digital versatile disk (DVD), a Blu-ray Disc™, or a memory associated with the processing unit 302, but the entire program and/or parts thereof could alternatively be executed by a device other than the processing unit 302 and/or embodied in firmware or dedicated hardware. Many other methods of implementing the example controller module 300 may alternatively be used. The order of execution of blocks may be changed, and/or some of blocks described with reference to the example flow diagrams may be changed, eliminated, or combined.

As mentioned above, the example methods may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably.

Additionally or alternatively, the example methods may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

While an example manner of implementing the example aircraft-mounted rotor blade collision warning system 200 is illustrated in FIG. 2, one or more of the elements, processes and/or devices illustrated in FIG. 2 may be combined, divided, re-arranged, omitted, eliminated and/or implemented in any other way. Further, the example controller module 300 of FIG. 3 may be implemented by hardware, software, firmware and/or any combination of hardware, software and/or firmware. Thus, for example, the controller module 300 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

When reading any of the system claims of this patent to cover a purely software and/or firmware implementation, at least one of the example controller module 300 is hereby expressly defined to include a tangible computer readable storage device or storage disk such as a memory, a digital versatile disk (DVD), a compact disk (CD), a Blu-ray Disc™, etc. storing the software and/or firmware.

Although the above description describes the controller module 300 providing output signals to the warning device 240 using input signals from the plurality of sensors 210 based upon an algorithm, it is conceivable that the controller module 300 provide output signals to the warning device 240 using any combination of input signals from the plurality of sensors 210 and other sensors based upon a different algorithm.

Also, although the above description describes the example rotorcraft being a helicopter, it is conceivable that example rotorcraft be any type of aircraft. For example and without limitation, the aircraft may be a fixed wing, or a lighter than air aircraft. The aircraft may be manned or unmanned. As an example, the aircraft may be a commercial passenger aircraft operated by an airline, a cargo aircraft operated by a private or public entity, a military aircraft operated by a military or other government organization, a personal aircraft operated by an individual, or any other type of aircraft operated by any other aircraft operator. As another example, the aircraft may be an unmanned aerial vehicle (UAV) operated by a remote operator. Thus, those skilled in the art will appreciate that the aircraft may be designed to perform any mission and may be operated by any operator of the aircraft.

Further, although above is described an example system and example methods for aircraft in the aviation industry in accordance with FAA regulations, it is contemplated systems and methods may be implemented for any industry in accordance with the applicable industry standards.

Figure 7:
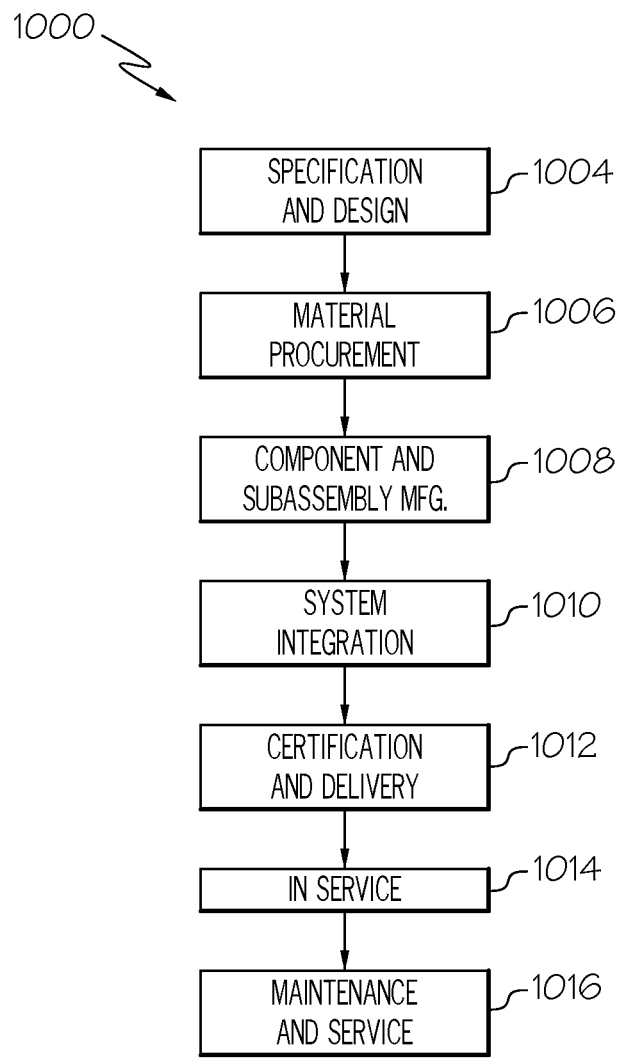
FIG. 7 is a flow diagram of an aircraft manufacturing and service methodology.
Figure 8:
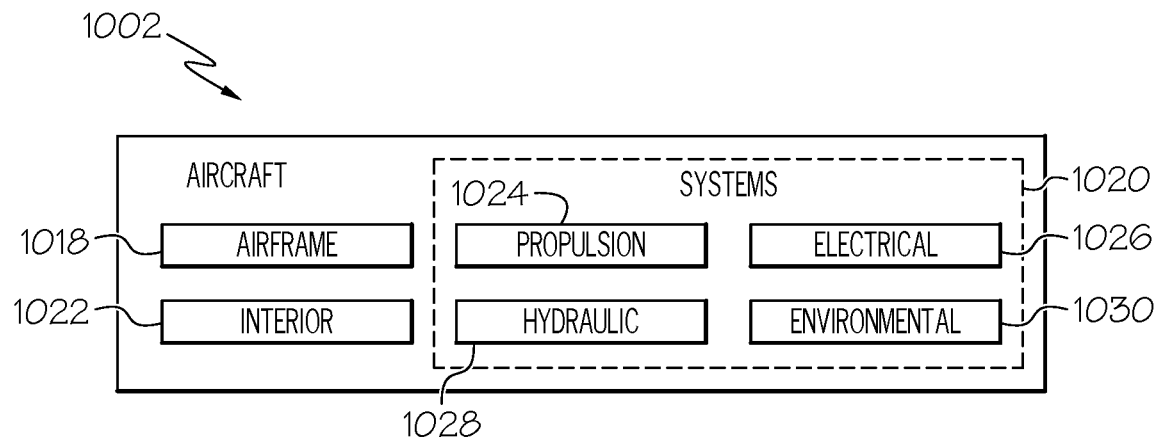
FIG. 8 is a block diagram of an aircraft.

Examples of the disclosure may be described in the context of an aircraft manufacturing and service method 1000, as shown in FIG. 7, and an aircraft 1002, as shown in FIG. 8. During pre-production, the aircraft manufacturing and service method 1000 may include specification and design 1004 of the aircraft 1002 and material procurement 1006. During production, component/subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine maintenance and service 1016, which may also include modification, reconfiguration, refurbishment and the like.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 8, the aircraft 1002 produced by example method 1000 may include an airframe 1018 with a plurality of systems 1020 and an interior 1022. Examples of the plurality of systems 1020 may include one or more of a propulsion system 1024, an electrical system 1026, a hydraulic system 1028, and an environmental system 1030. Any number of other systems may be included.

The disclosed warning systems and warning methods may be employed during any one or more of the stages of the aircraft manufacturing and service method 1000. As one example, components or subassemblies corresponding to component/subassembly manufacturing 1008, system integration 1010, and/or maintenance and service 1016 may be assembled using the disclosed warning systems and warning methods. As another example, the airframe 1018 may be constructed using the disclosed warning systems and warning methods. Also, one or more apparatus examples, method examples, or a combination thereof may be utilized during component/subassembly manufacturing 1008 and/or system integration 1010, for example, by substantially expediting assembly of or reducing the cost of an aircraft 1002, such as the airframe 1018 and/or the interior 1022. Similarly, one or more of system examples, method examples, or a combination thereof may be utilized while the aircraft 1002 is in service, for example and without limitation, to maintenance and service 1016.

Although various examples of the disclosed systems and methods have been shown and described, modifications may occur to those skilled in the art upon reading the specification. The present application includes such modifications and is limited only by the scope of the claims.

What is claimed is:

1. A method for alerting a crew member of a rotorcraft of a potential collision of a rotor blade of the rotorcraft having a rotor shaft and a rotor azimuth, the method comprising:
estimating a total rotor flapping value associated with the rotor blade during an operating condition of the rotorcraft, wherein the estimated total rotor flapping value is relative to the rotor shaft as a function of the rotor azimuth, said estimating comprises adding a mean blade flap angle associated with the rotor blade to first harmonic flapping angles relative to the rotor shaft;
comparing the estimated total rotor flapping value to a rotor flapping limit value during the operating condition of the rotorcraft; and
sending a warning signal to a warning device when the estimated total rotor flapping value lies outside of the rotor flapping limit value to alert the crew member of a potential collision of the rotor blade of the rotorcraft.

2. The method according to claim 1 wherein the mean blade flap angle associated with the rotor blade is calculated based upon rotor speed, rotor blade properties, rotor hub properties, collective pitch of the rotor blade, air density, total inflow of air, and longitudinal and lateral air velocity components of a measured air velocity vector.

3. The method according to claim 2 wherein the total inflow of air is a sum of an inflow air velocity component of the measured air velocity vector and an induced inflow that is calculated based upon rotor speed, rotor blade properties, rotor hub properties, collective pitch of the rotor blade, air density, and longitudinal and lateral air velocity components of the measured air velocity vector.

4. The method according to claim 3 wherein the longitudinal, lateral, and inflow air velocity components of the measured air velocity vector are transformed into a rotor control axis using (i) an orientation of a rotor shaft axis in a rotorcraft body axis, and (ii) an orientation of the rotor control axis in the rotor shaft axis.

5. The method according to claim 4 wherein the orientation of the rotor control axis is defined by a finite pitch rotation in the rotor shaft axis and a finite roll rotation in the rotor shaft axis.

6. The method according to claim 1 wherein sending the warning signal to the warning device when the estimated total rotor flapping value lies outside of the rotor flapping limit value to alert the rotorcraft crew member of the rotor blade of the rotorcraft comprises sending the warning signal to an aural warning device when the estimated total rotor flapping value exceeds the rotor flapping limit value.

7. The method according to claim 1 wherein sending the warning signal to the warning device when the estimated total rotor flapping value lies outside of the rotor flapping limit value to alert the rotorcraft crew member of the rotor blade of the rotorcraft comprises sending the warning signal to a visual warning device when the estimated total rotor flapping value exceeds the rotor flapping limit value.

8. The method according to claim 1 wherein sending the warning signal to the warning device when the estimated total rotor flapping value lies outside of the rotor flapping limit value to alert the rotorcraft crew member of the rotor blade of the rotorcraft comprises sending the warning signal to a haptic cueing warning device when the estimated total rotor flapping value exceeds the rotor flapping limit value.

9. The method according to claim 1 further comprising: determining the rotor blade flapping limit value based upon a combination of rotor speed, rotor azimuth, and rotor elastic deformations.

10. The method according to claim 1 wherein the method is performed by a processing unit, the processing unit comprising:
a processor; and
a data storage unit, the data storage unit having a memory, wherein the processor executes one or more application programs which are tangibly embodied in the data storage unit and readable by the processor.

11. A rotorcraft-mounted rotor blade collision warning system comprising:
a plurality of sensors configured to capture sensor data associated with the operation condition of the rotorcraft; and
a controller module having a processing unit having a processor, the processing unit being configured to process the sensor data, wherein the sensor data associated with the operating condition of the rotorcraft is captured and processed in accordance with the method of claim 1.

12. The rotorcraft-mounted rotor blade collision warning system of claim 11, wherein the plurality of sensors of the rotor blade collision warning system comprises at least one of a system enable/disable switch, a weight-on-wheels sensor, a radar altimeter sensor, a rotor speed sensor, an airspeed sensor, a ground speed sensor, one or more actuator position sensors, and an air density sensor and wherein the sensor data is provided by the at least one of the system enable/disable switch, weight-on-wheels sensor, radar altimeter sensor, rotor speed sensor, airspeed sensor, ground speed sensor, one or more actuator position sensors, and air density sensor.

13. The rotorcraft-mounted rotor blade collision warning system of claim 12, wherein the warning system is disabled by the controller module when the rotor speed sensor provides a signal indicative of the rotor speed being below a predetermined rotor speed value.

14. The rotorcraft-mounted rotor blade collision warning system of claim 12, wherein the warning system is disabled by the controller module when either the airspeed sensor provides a signal indicative of the airspeed exceeding a predetermined airspeed value or the ground speed sensor provides a signal indicative of the ground speed exceeding a predetermined ground speed value.

15. A rotorcraft-mounted rotor blade collision warning system comprising:
a plurality of sensors associated with the rotorcraft and for providing a plurality of signals indicative of operating parameters of the rotorcraft;
a warning device for alerting a rotorcraft crew member of a potential collision of a rotorcraft rotor blade; and
a controller module having a processing unit, the processing unit comprising a processor, said controller module configured to:
(i) calculate an estimated total rotor flapping state associated with the rotorcraft rotor blade by adding a mean blade flap angle associated with the rotorcraft rotor blade to first harmonic flapping angles relative to a rotor shaft;
(ii) compare the estimated total rotor flapping state with a rotor flapping limit; and
(iii) send a signal to the warning device to alert a rotorcraft crew member of a potential collision of a rotorcraft rotor blade when the estimated total rotor flapping state is outside of the rotor flapping limit to alert the rotorcraft crew member of the potential collision of the rotorcraft rotor blade.

16. The rotorcraft-mounted rotor blade collision warning system according to claim 15 wherein the controller module is configured to send a signal to the warning device to alert a rotorcraft crew member of a potential collision of the rotorcraft rotor blade when the estimated total rotor flapping state exceeds the rotor flapping limit to alert the rotorcraft crew member of the potential collision of the rotorcraft rotor blade.

17. The rotorcraft-mounted rotor blade collision warning system according to claim 15 wherein the plurality of sensors comprises a system enable/disable switch, a weight-on-wheels sensor, a radar altimeter sensor, a rotor speed sensor, an airspeed sensor, a ground speed sensor, one or more actuator position sensors, and an air density sensor.

18. The rotorcraft-mounted rotor blade collision warning system according to claim 15 wherein the warning device comprises at least one of an aural warning device, a visual warning device, and a haptic cueing warning device.

19. The rotorcraft-mounted rotor blade collision warning system according to claim 15 wherein the rotor flapping is relative to the rotor shaft as a function of a rotor azimuth.

20. The rotorcraft-mounted rotor blade collision warning system of claim 15, wherein the mean blade flap angle associated with the rotorcraft rotor blade is calculated based upon rotor speed, rotor blade properties, rotor hub properties, collective pitch of the rotor blade, air density, total inflow of air, and longitudinal and lateral air velocity components of a measured air velocity vector.

* * * * *